United States Patent
Converse et al.

(10) Patent No.: US 6,611,374 B2
(45) Date of Patent: Aug. 26, 2003

(54) OPTICAL AMPLIFIER CONTROLLER HAVING ADJUSTABLE SLEW-RATE LIMITER

(75) Inventors: Eric James Converse, Jenkintown, PA (US); David Ciaffa, Howell, NJ (US); Charles John Donaldson, Ottsville, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 10/062,754

(22) Filed: Jan. 31, 2002

(65) Prior Publication Data

US 2003/0142396 A1 Jul. 31, 2003

(51) Int. Cl.[7] .................. H04B 10/12; H04B 10/02; H01S 3/00
(52) U.S. Cl. ................. 359/341.4; 359/337.11; 359/341.41; 359/341.42; 359/177; 372/38.1; 372/38.01; 372/38.02; 372/38.06; 372/38.07
(58) Field of Search ................ 359/357.11, 341.4, 359/341.41, 341.42, 341.43, 177; 372/38.1, 38.01, 38.02, 38.06, 38.07

(56) References Cited

U.S. PATENT DOCUMENTS

| 5,457,568 A | * | 10/1995 | Jacobovitz-Veselka et al. ............... 359/341.3 |
| 5,892,616 A | * | 4/1999 | Takahashi ................ 359/341.43 |
| 6,166,850 A | * | 12/2000 | Roberts et al. ............ 359/341.2 |
| 6,219,177 B1 | * | 4/2001 | Tamura ..................... 359/341.1 |
| 2001/0040720 A1 | * | 11/2001 | Gerrish et al. .............. 359/341.4 |
| 2001/0050802 A1 | * | 12/2001 | Namiki et al. .............. 359/337.11 |
| 2002/0093729 A1 | * | 7/2002 | Gerish et al. .............. 359/341.41 |

OTHER PUBLICATIONS

Murakami et al. "A remote Supervisory System Based on Subcarrier Overmodulation for Submarine Optical Amplifier Systems" J. Lightwave Tech. 14: May 5, 1996, pp. 671–677.*
Force, Inc. "Application Note: Applying Optical Amplifiers" AN127B, Mar. 2001.*
Pacific Broadband Networks, "Light Link Series 4, EDFA" 2001.*

(List continued on next page.)

Primary Examiner—Thomas G. Black
Assistant Examiner—Andrew R Sommer
(74) Attorney, Agent, or Firm—Mayer Fortkort & Williams, PC; Stuart H. Mayer, Esq.

(57) ABSTRACT

A method and apparatus is provided for controlling the optical output power from an optical amplifier arrangement. The arrangement includes a rare-earth doped fiber for imparting gain to an optical input signal propagating therethrough, a pump source for supplying pump power to the rare-earth doped fiber, and a tap for receiving a portion of the output power generated by the rare-earth doped fiber and converting it to a control signal. A controller is also provided for receiving the control signal and generating a bias current in response thereto for driving the pump source. The method begins by receiving an optical input signal that is being amplitude modulated at a prescribed frequency. The slew rate of the controller is adjusted so that the bias current drives the pump source to generate pump power that cannot vary at a rate greater than a slew-rate limit established by the controller. In this way resonance between the input signal and the frequency of the feedback control loop can be avoided.

27 Claims, 1 Drawing Sheet

OTHER PUBLICATIONS

Agere Systems, "Technical Note: 1724–Type Erbium–Doped Fiber Amplifier Evaluation Board," Apr. 1998.*

Agere Systems, "Technical Note: 1724–Type Erbium–Doped Fiber Amplifier Evaluation Software Program," Apr. 1998.*

Fitel Technologies, Inc. "Data Sheet: ErFA 3300 Series, Fully Digitized MPU Controlled EDFA." Feb. 2000.*

"Slew rate" definition. Available at www.accessscience.com (last modified Apr. 10, 2000).*

* cited by examiner

OPTICAL AMPLIFIER CONTROLLER HAVING ADJUSTABLE SLEW-RATE LIMITER

FIELD OF THE INVENTION

The present invention relates generally to optical amplifiers, and more particularly to an optical amplifier arrangement having a controller with a user-adjustable slew-rate limiter.

BACKGROUND OF THE INVENTION

Currently, transmission systems employed in the cable television industry provide two-way transmission of information (e.g., video, multimedia and/or data) between the headend and a plurality of subscribers. Typically, the headend transmits the information destined for individual subscribers in an optical format, via one or more fiber optic links to one or more optical nodes. Each node converts the optically formatted downstream information into electrical signals for distribution, typically via a cable plant having a hybrid fiber/coax (HFC) architecture, to individual subscribers. In addition to receiving the downstream information, each individual subscriber may generate information in the form of voice, data, or a combination thereof, destined for the headend. En route to other subscribers or service providers, the subscriber-generated information is segmented by the coaxial cable plant and passes it to the node for conversion into an optical format for transmission to the headend.

Such transmission systems typically employ optical amplifiers along the fiber optic links to amplify the optical signals being transmitted. One example of a conventional optical amplifier is a rare-earth doped optical amplifier, which uses rare-earth ions as the active element. The ions are doped in the fiber core and pumped optically to provide gain. The silica fiber core serves as the host medium for the ions. While many different rare-earth ions such as neodymium, praseodymium, ytterbium etc. can be used to provide gain in different portions of the spectrum, erbium-doped fiber amplifiers (EDFAs) have proven to be particularly attractive because they are operable in the spectral region where optical loss in the fiber is minimal. Also, the erbium-doped fiber amplifier is particularly useful because of its ability to amplify multiple wavelength channels without crosstalk penalty, even when operating deep in gain compression. EDFAs are also attractive because they are fiber devices and thus can be easily connected to other fiber links with low loss.

Optical amplifiers often employ electronic feedback arrangements to control the output power from the amplifier. For example, the feedback arrangement may be used to provide a constant gain or a constant output power. One limitation of conventional optical amplifiers that employ a feedback arrangement to control the output power is that they typically offer a fixed frequency response. This presents a problem if the modulation frequency of the input signal is in resonance with the frequency of the feedback control loop. In this case the output power from the amplifier may undergo an additional amplification on the output that is undesirable. To avoid this problem, manufacturers typically set the frequency response to a fixed value that is low enough so that most frequencies at which the input signal is likely to undergo modulation will not create a resonance condition. While this is often a satisfactory approach, it hampers the response time of the optical amplifier.

Accordingly, there is need for a more flexible optical amplifier arrangement whose frequency response can be controlled to offer a fast response time and the ability to properly handle low frequency modulated input signals under appropriate circumstances.

SUMMARY OF THE INVENTION

In accordance with the present invention, a method and apparatus is provided for controlling the optical output power from an optical amplifier arrangement. The arrangement includes a rare-earth doped fiber for imparting gain to an optical input signal propagating therethrough, a pump source for supplying pump power to the rare-earth doped fiber, and a tap for receiving a portion of the output power generated by the rare-earth doped fiber and converting it to a control signal. A controller is also provided for receiving the control signal and generating a bias current in response thereto for driving the pump source. The method begins by receiving an optical input signal that is being amplitude modulated at a prescribed frequency. The slew rate of the controller is adjusted so that the bias current drives the pump source to generate pump power that cannot vary at a rate greater than a slew-rate limit established by the controller. In this way resonance between the input signal and the frequency of the feedback control loop can be avoided.

In accordance with one aspect of the invention, the optical output power from the optical amplifier is monitored and the slew rate is automatically adjusted in accordance therewith.

In accordance with another aspect of the invention, the power of the optical input signal is monitored and the slew rate is automatically adjusted in accordance therewith. In some cases the slew rate is automatically lowered when the power of the input signal fluctuates at a rate greater than a prescribed value. Moreover, the slew rate may be automatically increased to its previous value when the power of the input signal no longer fluctuates at a rate greater than the prescribed value.

In accordance with another aspect of the invention, an optical amplifier arrangement is provided which includes a rare-earth doped fiber for imparting gain to an optical input signal propagating therethrough. A pump source supplies pump power to the rare-earth doped fiber. The arrangement also includes a tap for receiving a portion of the output power generated by the rare-earth doped fiber and converting it to a control signal. A controller receives the control signal and generating a bias current in response thereto for driving the pump source. The controller includes a user-adjustable slew rate limiter for selectively adjusting the slew rate of the controller.

In accordance with yet another aspect of the invention, the user-adjustable slew rate limiter is hardware-controllable. Alternatively, the user-adjustable slew rate limiter may be software-controllable.

DETAILED DESCRIPTION

Figure 1:
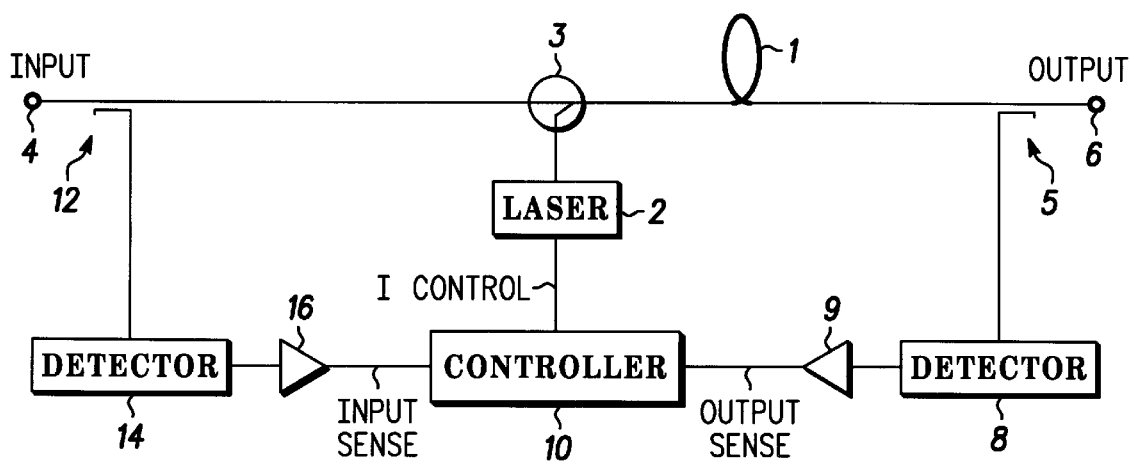
FIG. 1 shows an optical amplifier with a feedback control arrangement constructed in accordance with the present invention.

FIG. 1 shows an optical amplifier with a feedback control arrangement constructed in accordance with the present invention. The arrangement of FIG. 1 comprises an erbium doped fiber 1, a pump laser 2, a coupler 3 which couples the pump laser output with an input optical signal which is to be amplified, an input signal tap 12, which serves to split off a small portion of the input signal to doped fiber 1, an output signal tap 5, which serves to split off a small portion of the output signal, an output port 6 for receiving the amplified optical signal, detectors 8 and 14, electronic amplifiers 9 and 16 and a controller 10. It should be noted that controller 10 may incorporate any necessary optical to electrical conversion elements, eliminating the need for detectors 8 and 14 and electronic amplifiers 9 and 16.

In operation, the optical signal to be amplified is input via port 4 and combined with the optical pump signal output from laser 2 so that the signal is amplified in the erbium doped fiber 1 in a conventional manner. Tap 12, which may be a fused fiber coupler, for example, splits off a small proportion of the signal input to the fiber 1. This small part of the input signal, which is optionally employed as an input control signal, is detected by detector 14, amplified by electronic amplifier 16 and applied to the controller 10. Likewise, tap 5, which may also be a fused fiber coupler, for example, splits off a small proportion of the amplified signal output from fiber 1. This small part of the amplified signal, which serves as an output control signal, is detected by detector 8, amplified by amplifier 9 and applied to the feedback circuit 10. Controller 10 determines the amplifier gain based on the output control signal and possibly on the input control signal as well. The output from the feedback circuit 10 is applied to the pump laser 2 and serves to vary the pump laser 2 output power to maintain, for example, constant gain or constant output power.

Controller 10 may use a variety of different approaches to determine the bias current applied to the pump laser 2. For example, controller 10 may be proportional, proportional-integral, or proportional-integral-differential in nature. If controller 10 is a proportional-integral-differential (PID) controller, for instance, the bias current will be the sum of the proportional, integral and differential control terms. The controller 10 may be configured in any manner known to those of ordinary skill in the art. For example, it may be implemented with either digital or analog electronics and in hardware or a combination of hardware and software.

Figure 2:
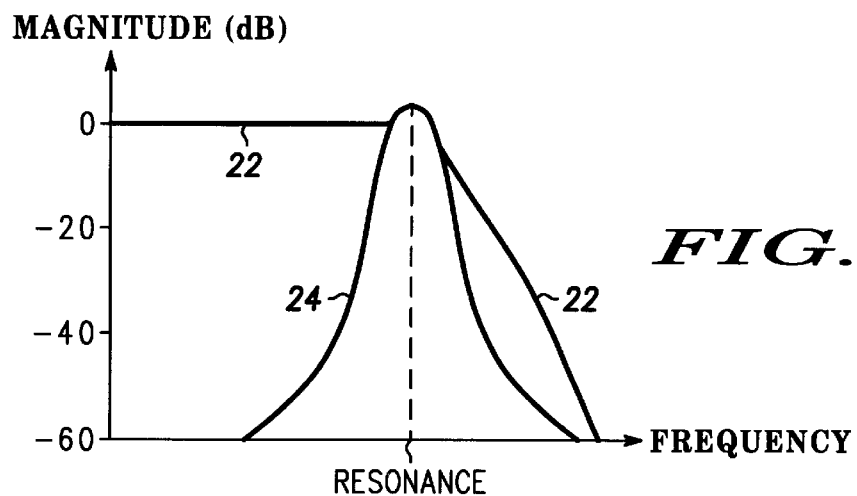
FIG. 2 shows the frequency response of the optical amplifier shown in FIG. 1.

A problem may arise in the EDFA arrangement depicted in FIG. 1 when the power of the input signal is modulated at or near the resonant frequency of the control loop. Under these circumstances the controller can cause undesirably large fluctuations in the output signal, decreasing the performance characteristics of the amplifier at that input frequency. This is indicative of a 90 degree phase shift between the input and output signals, the definition of the resonant frequency. This behavior is depicted in FIG. 2 for a controller that is to maintain a constant output power, which shows a graph of the magnitude (in dB) of the input signal (curve 24) and the output signal (curve 22) as a function of the modulation frequency. As shown, when the input signal is modulated at a frequency less than the resonant frequency, the output power remains constant. At the resonant frequency of the control loop the output power sharply increases, whereas above the resonant frequency the signal is attenuated.

The present inventors have recognized that the undesirable output power fluctuations that arise at or near the resonant frequency of the control loop can be removed by the addition of slew-rate limiting to the control signal of the controller. Slew-rate limiting of the control signal prevents the control signal from changing more rapidly than the slew-rate limit. Removal of the resonant condition in the controller by addition of a control signal slew-rate limit greatly enhances the ability of the optical amplifier to control differing input signals.

Figure 3:
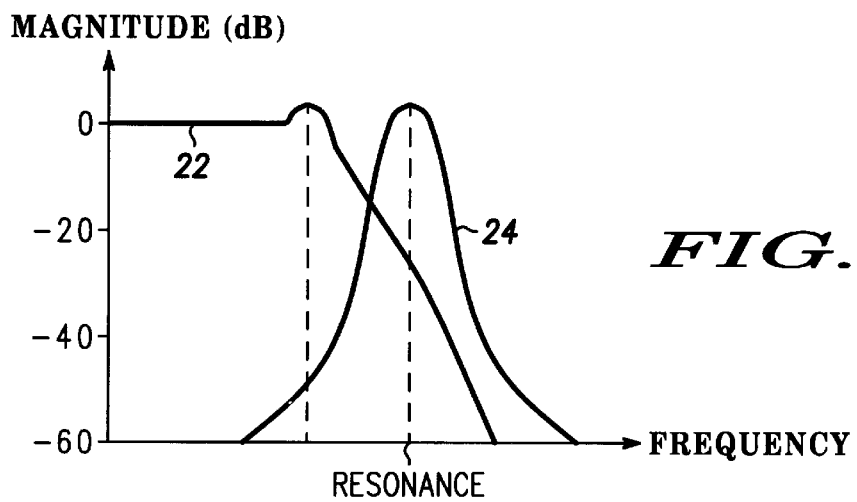
FIG. 3 shows the frequency response of the optical amplifier shown in FIG. 1 after adjusting the slew rate of the controller to prevent the control signal from changing more rapidly than the slew-rate limit.

Referring again to FIG. 2, the slew-rate limit is set near the resonant frequency of the control loop, thus allowing the slew-rate limit of the controller to change the output power at a rate sufficiently high to produce the undesirable fluctuations in output power. FIG. 3 shows a graph similar to that in FIG. 2 except that in this case the slew-rate limit is reduced from that in FIG. 2 so that the resonant frequency of the control loop is shifted to a lower value in the frequency bandwidth of the controller. As a result of reducing the response time of the amplifier in this manner, the input signal is no longer at the resonant frequency of the control loop.

By allowing the user to adjust the slew-rate of the optical amplifier arrangement the user can tailor its modulation frequency response to their application-dependent needs. That is, instead of being limited to an optical amplifier with a fixed frequency response the user now has an optical amplifier with an adjustable modulation frequency response.

A user-adjustable slew-rate limiter in accordance with the present invention can be implemented in a number of different ways that are known to those of ordinary skill in the art. Different implementations may be chosen in part on the amplifier frequency response that is desired. For example, a hardware controlled slew-rate limiter would allow an output response that could be adjusted over a very wide range of modulation frequencies, but which would be incapable of handling low frequency modulations. This is a fundamental limitation because the size of the integrating capacitors (and their associated leakage current) that are needed at such frequencies creates a lower bound for lower frequency responses that approach 1 Hz. On the other hand, a software-controlled slew-rate limiter allows the frequency response to go to much lower frequencies than if it were implemented in hardware. Alternatively, if the adjustable slew-rate limiter were implemented in a digital signal processor (DSP), the frequency response could achieve a compromise between the hardware and software implementations. That is, a DSP would allow the controller's frequency response to encompass a wide range while still being usable at extremely low frequencies.

In one embodiment of the invention the adjustable slew-rate limiter may be under the active control of software. In this way the slew-rate limit could be adjusted in real-time by the software to provide an optimal response for any given application. The active control may be performed by monitoring the variations in the output power and increasing the slew-rate limit until the output power returns to a substantially constant value. Alternatively (or in addition), active control may be performed by monitoring the optical input signal and when the input signal fluctuates at a rate greater than some predefined value the slew-rate limit could be lowered for the duration of the time that the input signal is fluctuating above this value. When the input signal is no longer fluctuating so rapidly, the slew-rate limit could be returned to its previous setting.

In a preferred embodiment of the invention, if the input signal is being monitored in the aforementioned manner it may also be advantageous to calculate its Fast-Fourier-Transform (FFT) so that the slew-rate limit could be set to the precise value that gives the best overall response, but which is still lower than the resonant frequency of the control loop. The FFT could be performed, for example, in a DSP. Because most applications will not likely need the optical amplifier to provide an immediate change in its response, the FFT could be processed over a substantially longer time period than the response time of the control loop. One particular advantage of this approach is that there is no need to change the controller constants, making the overall frequency control significantly easier to implement once the desired frequency response is known.

What is claimed is:

1. A method for controlling the optical output power from an optical amplifier arrangement that includes a rare-earth doped fiber for imparting gain to an optical input signal propagating therethrough, a pump source for supplying pump power to the rare-earth doped fiber, a tap for receiving a portion of the output power generated by the rare-earth doped fiber and converting said portion of the output power to a control signal, and a controller receiving the control signal and generating a bias current in response thereto for driving the pump source, said method comprising the steps of:

receiving an optical input signal being amplitude modulated at a prescribed frequency; and adjusting the slew rate of the controller so that the bias current drives the pump source to generate pump power that cannot vary at a rate greater than a slew-rate limit established by the controller.

2. The method of claim 1 further comprising the steps of monitoring the output power and automatically adjusting the slew rate in accordance therewith.

3. The method of claim 1 further comprising the steps of monitoring the power of the optical input signal and automatically adjusting the slew rate in accordance therewith.

4. The method of claim 3 wherein the step of automatically adjusting the slew rate includes the step of automatically lowering the slew rate when the power of the input signal fluctuates at a rate greater than a prescribed value.

5. The method of claim 4 further comprising the step of automatically increasing the slew rate to a previous value when the power of the input signal no longer fluctuates at a rate greater than the prescribed value.

6. The method of claim 3 wherein the step of monitoring the power of the optical input signal includes the step of calculating the fast-Fourier transform of the optical input signal and automatically adjusting the slew rate in accordance therewith.

7. The method of claim 1 further comprising the step of maintaining the optical output power at a substantially constant value.

8. The method of claim 1 further comprising the step of maintaining the arrangement at a substantially constant gain.

9. A method for controlling the optical output power from an optical amplifier arrangement that includes a rare-earth doped fiber for imparting gain to an optical input signal propagating therethrough, a pump source for supplying pump power to the rare-earth doped fiber, a tap for receiving a portion of the output power generated by the rare-earth doped fiber and converting said portion of the output power to a control signal, and a controller receiving the control signal and generating a bias current in response thereto for driving the pump source, said method comprising the steps of:

receiving an optical input signal being amplitude modulated at a prescribed frequency; and adjusting the slew rate of the controller so that a control loop resonant frequency is offset from the prescribed frequency at which the optical input signal is being modulated.

10. The method of claim 9 further comprising the steps of monitoring the output power and automatically adjusting the slew rate in accordance therewith.

11. The method of claim 9 further comprising the steps of monitoring the power of the optical input signal and automatically adjusting the slew rate in accordance therewith.

12. The method of claim 11 wherein the step of monitoring the power of the optical input signal includes the step of calculating the fast-Fourier transform of the optical input signal and automatically adjusting the slew rate in accordance therewith.

13. The method of claim 11 wherein the step of automatically adjusting the slew rate includes the step of automatically lowering the slew rate when the power of the input signal fluctuates at a rate greater than a prescribed value.

14. The method of claim 13 further comprising the step of automatically increasing the slew rate to a previous value when the power of the input signal no longer fluctuates at a rate greater than the prescribed value.

15. The method of claim 9 further comprising the step of maintaining the optical output power at a substantially constant value.

16. The method of claim 9 further comprising the step of maintaining the arrangement at a substantially constant gain.

17. An optical amplifier arrangement comprising:

a rare-earth doped fiber for imparting gain to an optical input signal propagating therethrough;

a pump source for supplying pump power to the rare-earth doped fiber;

a tap for receiving a portion of the output power generated by the rare-earth doped fiber and converting said portion of the output power to a control signal; and a controller receiving the control signal and generating a bias current in response thereto for driving the pump source, said controller including a user-adjustable slew rate limiter for selectively adjusting the slew rate of the controller.

18. The optical amplifier arrangement of claim 17 wherein said rare-earth doped fiber is doped with erbium.

19. The optical amplifier arrangement of claim 17 wherein the user-adjustable slew rate limiter is hardware-controllable.

20. The optical amplifier arrangement of claim 17 wherein the user-adjustable slew rate limiter is software-controllable.

21. The optical amplifier arrangement of claim 17 further comprising means for monitoring the output power and automatically adjusting the slew rate in accordance therewith.

22. The optical amplifier arrangement of claim 17 further comprising means for monitoring the power of the optical input signal and automatically adjusting the slew rate in accordance therewith.

23. The optical amplifier arrangement of claim 22 wherein the means for automatically adjusting the slew rate includes means for automatically lowering the slew rate when the power of the input signal fluctuates at a rate greater than a prescribed value.

24. The optical amplifier arrangement of claim 23 further comprising means for automatically increasing the slew rate to a previous value when the power of the input signal no longer fluctuates at a rate greater than the prescribed value.

25. The optical amplifier arrangement of claim 22 wherein the means for monitoring the power of the optical input signal includes means for calculating the fast-Fourier transform of the optical input signal and automatically adjusting the slew rate in accordance therewith.

26. The optical amplifier arrangement of claim 17 wherein said controller is configured to maintain the optical output power at a substantially constant value.

27. The optical amplifier arrangement of claim 17 wherein said controller is configured to maintain the arrangement at a substantially constant gain.

* * * * *